Dec. 28, 1926.                                                      1,612,737
                            J. B. LANE
      MOLDING APPARATUS FOR CASTING MOLTEN MATERIAL IN CONTINUOUS LENGTHS
                         Filed Dec. 5, 1925
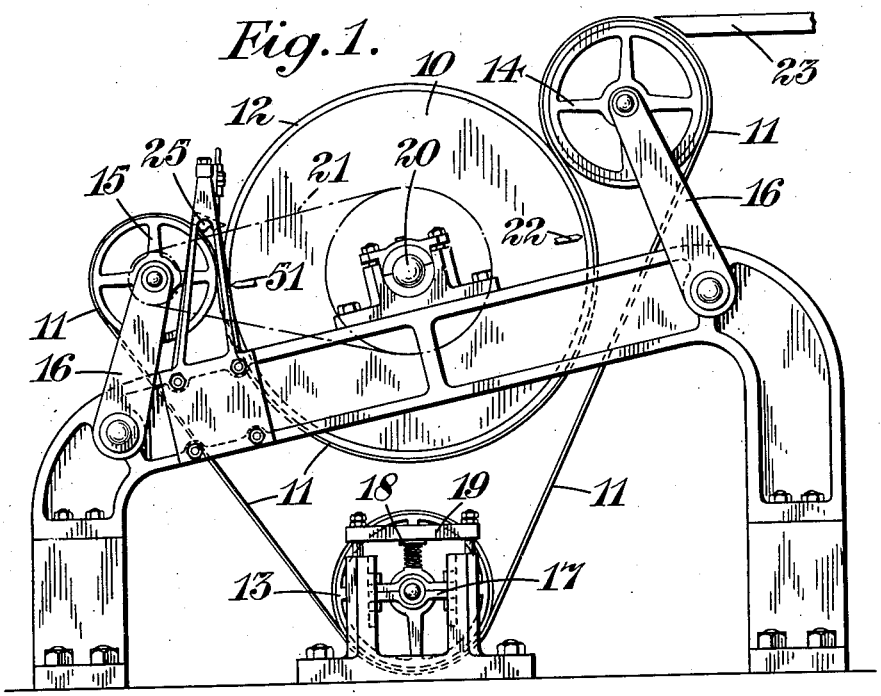
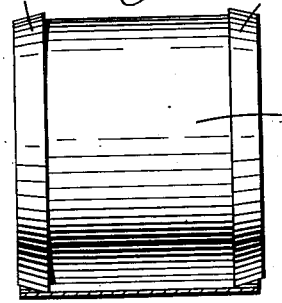
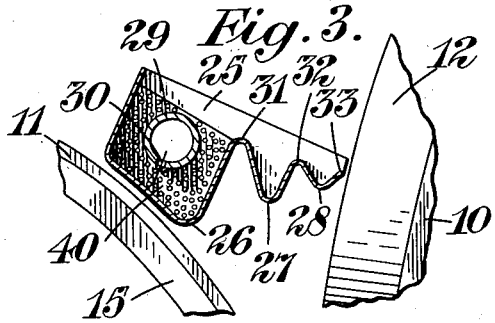
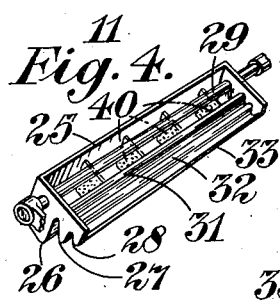
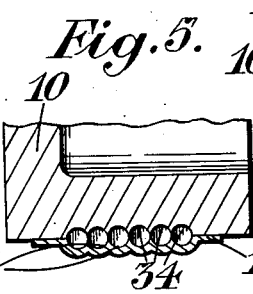
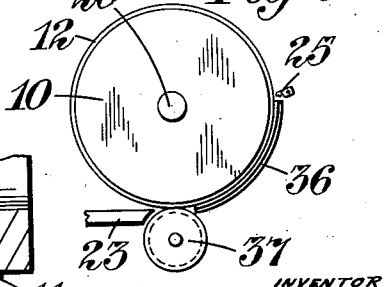
INVENTOR
John B. Lane,
By Watson, Coit, Moror & Grindle
ATTYS.

Patented Dec. 28, 1926.

1,612,737

UNITED STATES PATENT OFFICE.

JOHN BURR LANE, OF LONDON, ENGLAND.

MOLDING APPARATUS FOR CASTING MOLTEN MATERIAL IN CONTINUOUS LENGTHS.

Application filed December 5, 1925, Serial No. 73,412, and in Great Britain November 10, 1924.

This invention relates to molding apparatus for casting molten material in continuous lengths. The invention is particularly concerned with the manufacture of pipes, tubes, sheets, rods and other castings in continuous lengths from lead, but it is also applicable to other metals and materials which can be similarly rendered molten by heat and solidified by cooling.

The invention provides molding apparatus for casting molten material in a continuous length greater than that of the mold, comprising an open-ended molding chamber (open at one end to receive the molten material and open at the other for the delivery of the casting) constituted wholly or in part by portions of endless surfaces, which surfaces are movable (e. g. continuously) from the inlet to the outlet end of the molding chamber so that successive portions of said surfaces form in turn their part of the molding chamber.

In one form of the invention the molding-chamber walls are constituted as to one part by a portion of the periphery of a rotatable cylinder and as to the other part by an endless band or apron encircling the aforesaid portion of the cylinder's periphery and spaced apart therefrom to provide the throughway of the mold. In operation the cylinder is rotated and the endless band translated at the same surface speed and in the same direction from the inlet to the outlet end of the mold.

When the casting is to be in the form of a continuous sheet, or strip the sides of the cylinder aforesaid or of the endless band, or of both, are formed with peripheral flanges arranged to act as distance-pieces between the cylinder and the band and as closure walls for the sides of the molding chamber.

In the apparatus described above the periphery of the cylinder or of the endless band or of both, may be so formed as to provide a plurality of separate molding chambers located side by side across the width of the cylinder. The apparatus is then adapted for the simultaneous production of a plurality of castings in continuous lengths.

In a modification according to this invention the molding chamber walls are constituted as to one part by a portion of the periphery of a rotatable cylinder and as to the other part by a fixed wall encircling the aforesaid portion of the cylinder's periphery and spaced apart therefrom so as to provide the throughway of the mold.

According to a feature of the invention a special form of pouring device is provided for use with the molding apparatus where the latter is employed for casting the molten material in sheet form. This device comprises a conduit arranged to receive the molten material and to direct it towards the inlet to the molding chamber in a stream of width approximately equal to or slightly greater than that of the sheet to be formed, combined with a weir or weirs extending across the conduit at the delivery end thereof. The molten material in passing from the delivery conduit to molding chamber is constrained to flow over the weir or weirs aforesaid which tends to produce an even distribution of the material across the width of the mold.

Some forms of apparatus embodying the invention will now be described by way of example, reference being made to the accompanying drawings (which to some extent are diagrammatic) in which—

Figure 1 is a side elevation of a sheet-casting machine.

Figure 2 is an elevation showing the casting cylinder in detail.

Figure 3 is a section of the pouring device.

Figure 4 is a perspective view showing the pouring device in position.

Figure 5 is a section illustrating a rod or cable-forming machine, and

Figure 6 is an end elevation showing a modified form of machine.

Like reference numerals indicate like parts throughout the figures.

In the first example (Figures 1–4) the apparatus is designed for the manufacture of sheet lead by a continuous process. The apparatus comprises a cylindrical drum 10 mounted for rotation about a horizontal axis and having the lower portion of its periphery encircled by an endless apron 11 conveniently in the form of an endless steel band. The endless band is spaced apart from the surface of the drum 10 by peripheral flanges or collars 12 formed on or secured to the drum at the side margins thereof. The throughway of the mold is constituted by the space between the drum 10 and the endless band 11 and, as will be understood, the depth of this throughway is determined by the depth (considered in a radial direction) of the flanges or collars 12 on the drum. These flanges or collars not only act as distance pieces between the band and the drum but also as side closure walls for the mold chamber. The endless band 11 is passed over three guide pulleys 13, 14, 15 the pulley 13 being located below the drum and the pulleys 14, 15 positioned one on each side thereof. The side pulleys 14, 15 are carried on pivotal arms 16 and the bottom pulley 13 is adjustable so as to vary the tension on the band. The arms 16 carrying the side pulleys extend inwardly from their pivot points towards the drum and the side pulleys are therefore pressed towards the periphery of the drum by the tension on the endless band. The bottom pulley 13 is mounted in an adjustable bearing 17 which is pressed downwardly by a spring 18 located between the bearing and a yoke-member 19. The tension on the endless band may be varied by adjusting the position of the member 19. Instead of the arrangement described above the bearing of the bottom pulley may be carried on a weighted lever or other means may be provided to exert a resilient pressure on the band for the purpose of maintaining it taut.

The mouth or inlet end of the mold chamber is formed where the band 11 meets the drum 10 at one side thereof (the left hand side in Figure 1) and the outlet end of the mold chamber is at the opposite side of the drum where the endless band leaves the surface thereof (the right-hand side in Figure 1).

In operation molten lead is delivered continuously to the mouth of the molding-chamber and the drum is rotated in a direction such that the portion of its periphery constituting a part of the mold chamber is moved from the inlet to the outlet end thereof. The endless band is also translated at the same surface speed as the drum and in the same direction. The drum is mounted on a shaft 20 which is driven by any convenient means. The band 11 is positively driven by virtue of a driving connection, such as the chain 21, between the drum shaft 20 and the pulley 15. Cold water or other cooling liquid is directed on to the exterior of the molding chamber, conveniently by circulating water within the drum, the water entering at the nozzle 51 and leaving at the point 22.

The molten lead entering the molding chamber is carried round by the drum and band and solidified during its passage from the inlet to the outlet end of the mold. The molten lead is fed into the mold by way of a pouring device which will presently be described with reference to Figures 3 and 4 of the drawings. The solidified sheet is withdrawn continuously from the pulley 14 on to a delivery table 23. The process as will be seen is a continuous one, molten lead being supplied continuously at one end of the mold and the cast sheet being withdrawn in a continuous length at the other. Preferably the molten metal is supplied at such a rate, in relation to the surface speed of the drum, that the metal becomes heaped up to some extent at the mouth of the mold, and thereby compressed at the nip between the band and the drum.

Preferably the flanges 12 on the drum 10 are formed in the manner indicated in Figure 2. It has been found that with flanges which are flush with the endless band, there is a tendency for the molten material to get in between the flanges and the band thereby causing inequalities in the thickness of the finished sheet. By bevelling the flanges 12 as shown in Figure 2 the band makes approximately line-contact with the flanges and any material which does pass beyond the sides of the molding chamber is allowed a ready means of escape. The tendency for solidified lead to remain on the flanges and interrupt the uniform thickness of the sheet is in this way avoided or at least reduced to a minimum.

One preferred form of pouring device for use with the above apparatus is illustrated in Figures 3 and 4 of the drawings. It has been found that certain precautions in connection with the supply of molten material to the mold are necessary in order to obtain a sheet of uniform thickness throughout. Where for example there are several separate jets arranged in line and delivering to the mouth of the molding chamber, the finished sheet may to some extent be stratified longitudinally. This is undesirable. The best results are obtained where lead is delivered in a steady flowing stream of width slightly greater than that of the sheet to be formed. This object may be achieved by employing the device illustrated which comprises a conduit or channel 25, located above the inlet to the molding chamber and extending parallel with the meeting edges of the drum and band at said inlet. The conduit 25 is of slightly greater width than that of the molding chamber, and is divided in its length into three compartments 26, 27 and 28. The molten lead is supplied to the compartment 26 by a pipe 29 which extends across the full width of the conduit. The lead is fed into one end of the pipe 29 and is delivered therefrom through a slot 30 located in the lower portion of the pipe wall and extending along substantially the whole length of the pipe. The delivery from the pipe 29 into the compartment 26 is in the direction indicated by the arrow in Figure 3. The three compartments are separated from one another by weirs 31, 32 over which the molten material is constrained to flow on its way to the last compartment 28. From the latter the material is directed over an upturned lip 33 on to the advancing surface of the drum 10, and so into the molding chamber. The lead is fed continuously from a melting pot into the pipe 29 and from thence into the compartment 26. In order to prevent splashing of the lead in this compartment and further to ensure a steady and uniformly distributed flow over the weirs, the compartment 26 may be and preferably is fitted with several transverse baffles 40. The baffles are perforated to allow the lead to flow slowly from one side of each baffle to the other, and preferably the baffle plate or plates adjacent to the inlet end of the pipe 29 have a greater number of perforations than those remote from said end. This arrangement effectively retards the rush of lead along the compartment 26 in the direction of the length of the inlet pipe, and prevents splashing. The second compartment 27 may be similarly provided with baffle plates, but in order to guard against any tendency towards stratification, the last compartment 28 should not be sub-divided by baffles. I have found that where the stream of molten lead delivered by the conduit 25 is of the same width as that of the molding chamber, imperfections may appear at the edges of the cast sheet due to bubbles of air being entrapped in the molten material at the sides of the pouring conduit. I find it preferable therefore to employ a conduit which is of slightly greater width than that of the sheet to be formed and at each side extends slightly beyond the adjacent side of the molding chamber. A small quantity of lead is thus run to waste at each side of the molding chamber; this quantity being collected and remelted.

The sheet-casting apparatus described above may be adapted for the simultaneous formation of a number of castings (say rods or tubes) in continuous lengths. This application of the invention is illustrated in Figure 5. The periphery of the drum 10 (and also if necessary the surface of the band 11) is so formed as to provide a plurality of molding chambers arranged side by side across the width of the drum. For example the drum may be formed with a number of parallel channels 34 extending circumferentially and approximating to a semi-circle in cross-section. The band 11 may be flat and contact directly with the unchannelled portions of the drum, or as illustrated in Figure 5 the band may also be formed with circumferential channels indicated at 35, which register with those on the drum and co-operate therewith to form rods of approximately circular cross-section. This apparatus may be adapted to the formation of lead sheathing on cables. For this purpose guides (not shown) are provided at the mouth of the molding chamber and through these guides the cables to be covered are fed. The guides are so arranged that the cables pass centrally into the circular-section molds formed by the channelled portions of drum and band. The cables are fed at a rate corresponding with the surface speed of the drum and band, and molten lead is supplied continuously to the mouth of the molding chamber. The lead flows into the annular space surrounding each cable (which constitutes a core for the mold) and is immediately solidified by the application of cooling liquid to the exterior surfaces of the molding chamber walls. In this way it is possible to form a sheathing and simultaneously to apply it to a cable or other core in a single continuous operation.

A further example of apparatus embodying the invention is illustrated in Figure 6. The molding chamber in this case is constituted in part by a portion of the periphery of a rotatable drum 10 and in part by a fixed wall 36 which is shaped to encircle the aforesaid portion of the drum and is spaced apart therefrom to provide the throughway of the mold. Such an apparatus may be used for the production of sheet or strip material by providing side flanges such as 12, on the drum. Again, the drum and the fixed wall may be formed as above described to provide a plurality of mold chambers arranged side by side. With an arrangement of this kind where one of the mold chamber walls is fixed, it is necessary to provide means to ensure that the molten material as it solidifies, is carried forward by the drum towards the outlet end of the mold and prevented from sticking to the fixed wall. Conveniently, for this purpose, the greater portion of the molding-chamber is constituted by the endless surface of the drum. Where for example the drum and the fixed wall are formed with registering channels to provide a plurality of molds, the channels in the molds are made deeper than (and preferably also wider than) those in the fixed wall. In addition the surface of the drum may be serrated or otherwise roughened so as to grip the material being cast. Further means, such as a drawing-off pulley 37 may also be provided in order to ensure the effectiveness and continuity of the process.

In the construction described above the so-called fixed wall may be pivotally mounted at one end (preferably the lower end) for movement towards and away from the drum, while the other end of the wall is connected to a reciprocating device such as a crank or the like arranged to impart to the wall a rapid vibratory movement of small throw (say 1/64") about the aforesaid pivot. The vibration of the wall assists in preventing the molten material from sticking thereto and moreover effects intermittent compression of the material in the mold. This reciprocating arrangement is not shown in the drawings.

Various modifications may be made in the apparatus described herein without departing from the scope of the invention. For example the walls of the molding chamber may be formed by adjacent portions of two endless bands arranged for translation at the same surface speed and in the same direction. It will also be understood that the apparatus may be adapted to produce castings of any desired shape in cross-section, by an appropriate modification in the shape of the molding chamber walls.

What I claim as my invention and desire to secure by Letters Patent is:

1. A machine for molding continuous sheets, bars, or rods, including in combination, a rotatably mounted drum having spaced annular radially projecting continuous flanges, a continuous band adapted to contact with the flanges to form a matrix with the drum and flanges which extends partially around the drum, the flanges of the drum and the band having knife-edge contact for the purposes set forth.

2. A device of the kind described including in combination, a rotatable drum having longitudinally spaced peripheral flanges, said flanges having sharp inner edges and sloping peripheral faces, means cooperating with said drum and flanges to form an open ended matrix about a portion of said drum, and a conduit for supplying molten metal at one open end of the matrix, said conduit having a pouring width greater than the width between the flanges on the drum.

3. A device of the kind described including in combination, a rotatable molding drum having spaced annular flanges on its periphery, means cooperating with said drum and flanges to form an open ended matrix partially around said drum, and a conduit for supplying molten metal to one end of said matrix, said conduit having a supply pipe at one end and a compartment beneath said pipe of sufficient size to act as a reservoir to quiet the flow of metal and distribute it evenly along the length of the conduit, and said conduit also having other compartments separated by weirs to cause the metal to flow evenly into the matrix.

4. A pouring conduit of the kind described comprising in combination, a reservoir compartment, a supply pipe entering said compartment at one end and extending to the other end, a continuous slit in said pipe along its lower side, and a series of transverse baffles along said reservoir compartment for the purpose described.

5. A pouring conduit of the kind described, comprising in combination, a reservoir compartment, a supply pipe entering said compartment at one end and extending to the other end, a continuous slit in said pipe along its lower side, and a series of transverse perforated baffles along said reservoir compartment for the purpose described.

6. A pouring conduit of the kind described comprising in combination, a reservoir compartment, a supply pipe entering said compartment at one end and extending to the other end, a continuous slit in said pipe along its lower side, a series of transverse perforated baffles along said reservoir compartment, and other compartments parallel to said reservoir compartment into which molten metal is adapted to flow from said supply pipe and reservoir compartment, all for the purposes described.

7. A pouring conduit as claimed in claim 6 in which the total area of said baffle perforations decreases in each baffle from the end of said conduit where said supply pipe enters toward the other end thereof.

8. Molding apparatus of the type described including a rotatable peripherally flanged drum, an endless traveling band partly encircling said drum to form therewith an open ended matrix, and guide pulleys mounted adjacent the open ends of said matrix for carrying said band, said guide pulleys being movable toward and from said drum to yieldingly hold said band against said drum, said guide pulleys being mounted on pivotal arms extending upwardly and inwardly from their pivots toward said drum, the outer portion of said band being placed under tension to maintain it taut to force the pulleys toward the periphery of the drum.

9. Molding apparatus of the type described including a rotatable peripherally flanged drum, an endless traveling band partly encircling said drum to form therewith an open ended matrix, and guide pulleys mounted adjacent the open ends of said matrix for carrying said band, said guide pulleys being movable toward and from said drum to yieldingly hold said band against said drum, said guide pulleys being mounted on pivotal arms extending upwardly and inwardly from their pivots toward said drum, the outer portion of said band passing over a resiliently influenced pulley, movable in a direction to apply tension to the band to maintain it taut to force the pulleys toward the periphery of the drum.

10. A device for spreading a liquid on an adjacent surface, comprising, a liquid reservoir and a discharge lip, the lip being at a lower elevation than the discharge port of the reservoir, and means for conducting liquid from the discharge port of the reservoir to the lip including a transversely extending ridge or weir for the purpose of quieting the flow of the liquid to cause it to be uniformly distributed in its flow from the discharge lip and onto the surface.

11. A device for spreading a liquid on an adjacent surface, comprising, a liquid reservoir and a discharge lip, the lip being at a lower elevation than the discharge port of the reservoir, and a trough like throughway for conducting liquid from the discharge port of the reservoir to the lip, including a transversely extending horizontal ridge or weir for the purpose of quieting the flow of the liquid to cause it to be uniformly distributed in its flow from the discharge lip and onto the surface.

12. A device of the kind described, comprising in combination, a pouring conduit for molten metal, said conduit having an outlet orifice, a molding surface located adjacent said orifice and of approximately the same width as said orifice, said surface and said orifice being movable relative to each other, and said pouring conduit also having one or more weirs and one or more corresponding reservoir compartments arranged transversely thereon with respect to the direction of flow of metal toward the orifice, for the purposes described.

In testimony whereof I affix my signature.

JOHN BURR LANE.